Aug. 15, 1961 E. N. SHAWHAN 2,996,676
CONTROL APPARATUS WITH PULSE OUTPUT WHEN SLOPE
IS ZERO IN PREDETERMINED SENSE
Filed April 8, 1952 3 Sheets-Sheet 1

INVENTOR.
ELBERT NEIL SHAWHAN
BY
ATTORNEYS

Aug. 15, 1961 E. N. SHAWHAN 2,996,676
CONTROL APPARATUS WITH PULSE OUTPUT WHEN SLOPE
IS ZERO IN PREDETERMINED SENSE
Filed April 8, 1952 3 Sheets-Sheet 2

INVENTOR.
ELBERT NEIL SHAWHAN
BY
ATTORNEYS

*INVENTOR.*
ELBERT NEIL SHAWHAN
BY
ATTORNEYS

United States Patent Office 2,996,676
Patented Aug. 15, 1961

2,996,676
CONTROL APPARATUS WITH PULSE OUTPUT WHEN SLOPE IS ZERO IN PREDETERMINED SENSE
Elbert Neil Shawhan, Newton Square, Pa., assignor to Sun Oil Company, Philadelphia, Pa., a corporation of New Jersey
Filed Apr. 8, 1952, Ser. No. 281,247
6 Claims. (Cl. 328—132)

This invention relates to control apparatus particularly adapted for process control.

Control apparatus which is responsive to an abrupt or substantial change in a variable may be readily provided. However, there are certain processes in which the control signal of significance must be derived from the attainment of a maximum or minimum value by a variable. A maximum or minimum necessarily implies slow change of the value of the variable and heretofore it has been difficult to detect such a condition.

One of the objects of the present invention is the provision of an apparatus which is capable of detecting to a high degree of precision the attainment of a maximum or minimum condition of a variable undergoing change.

It will be evident that the terms maximum and minimum are interchangeable depending upon the viewpoint taken of a variable, and to simplify discussions herein reference will be made in particular to the detection of a minimum condition with the understanding that that term where used both in the specification and claims should be construed to include maximum as well.

The utility of the apparatus of the present invention is particularly apparent in connection with a process for the separation of the aromatic and saturate components of a distillate of petroleum origin by selective adsorption. Processes of this type will be found described in Lipkin Patent Re. 23,005, Hirschler et al. Patent 2,441,572, Lipkin Patent 2,576,525 and in Davis application S.N. 224,466, filed May 4, 1951, now Patent No. 2,653,175, dated September 22, 1953, and Olsen application S.N. 245,200, filed September 5, 1951, now Patent No. 2,716,144, dated August 23, 1955.

In certain processes of this type it has been found that a condition of minimum index of refraction of the effluent from an adsorbent bed represents the condition which properly establishes a datum point in time for a cyclical operation. The cycle in a typical example may be of the order of 60 minutes in length and the minimum value of the index of refraction is difficult to ascertain within a time of less than a minute. Obviously, therefore, if the value of the index of refraction was translated into a corresponding electrical signal, the second time derivative of change of this signal would be so small as not to be ascertainable from the standpoint of securing effective control thereby. In accordance with the present invention, accurate determination of a minimum of this type may be made.

As will be evident from the foregoing the invention is of quite general applicability where conditions such as those just indicated arise.

The type of adsorption process which has been briefly referred to but which will be described with reference to control matters more fully hereafter involves a cyclical operation to which the invention is particularly adapted. In one manner of practicing such process a fixed bed of adsorbing material has fed thereto in a complete cycle of operation three input constituents in sequence. As carried out, the introduction of these constituents is controlled by timed valves which are successively opened at various points in a cycle having equal periods, the subperiods of introduction of any particular material being equal in successive cycles. Also involved in the process is the necessity for routing an effluent from the adsorbent into two, and preferably three, different channels. The first suggestion which might be made as to this routing of the effluent would be to time phases of the cycle involving different routings of the effluent by time-controlled valves as in the case of the materials introduced. It will be at once apparent, however, that if the material or materials involved in the process differ in composition, the effluent phases should vary correspondingly. As will become clearer hereafter this is the situation which is encountered in practice and it becomes desirable to retime the cycle to the extent of the origins of the effluent routing phases.

A further object of the invention is concerned with the provision of a timing device which will properly determine the phases of a second group which are dependent not only on the phases of a first group of the cycle but upon some other variable, typically the composition of one or more of the introduced constituents in a process such as that indicated.

These and further objects of the invention particularly relating to details of apparatus and operations thereof to secure most satisfactory results will become apparent from the following description read in conjunction with the accompanying drawings in which.

Figure 1:
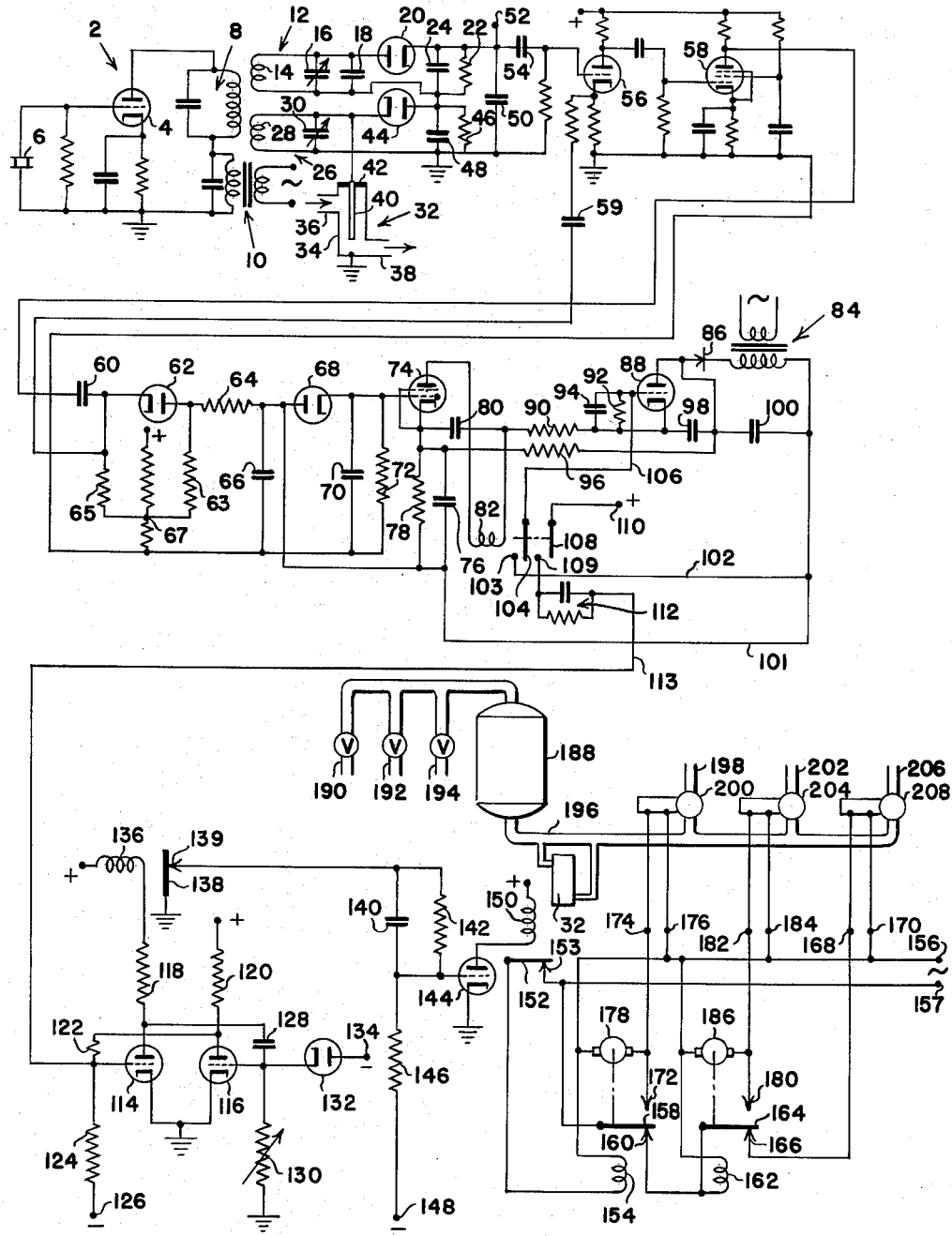
FIGURE 1 is a diagram partly of process apparatus and partly of control apparatus showing a preferred embodiment of the invention and its application to a particular process.

The control apparatus and its functions may be best described following a general outline of a process to which it is particularly applicable.

The type of process considered is more fully described in the patents and applications referred to above and may be generally stated to involve the separation of aromatic and saturate constituents of a distillate of petroleum origin by means of selective adsorption by an adsorbent such as silica gel, the aromatic and saturate constituents having such overlapping boiling points as to be substantially inseparable by distillation. In the variation of the process which is first herein specifically described as a cycle of operation involves the successive introduction to the adsorbent of the mixture of aromatic and saturate constituents which are to be separated, a desorbing material which will be specifically described as butane and a second desorbing material which will be specifically described as xylene (a mixture of xylenes). The xylene has a boiling range above that of the charging stock, while the butane boils below the boiling range of the charging stock. The aromatic components of the charging stock which are to be separated as high purity products are benzene and toluene. Considering the cycle of introduced materials it may be considered as starting with the desorbing xylenes practically saturating the adsorbent material, being both in the adsorbed phase and the liquid phase in the adsorbent tank.

It will be understood that there is here being described a somewhat idealized cycle at any given time, different parts of the adsorbent bed may be in different parts of the cycle due to the lag between inlet and outlet conditions. Consequently, at no time will the absorbed and liquid phases throughout the entire adsorbent bed consist purely of the aromatic desorbent. The charging stock will now be introduced for a predetermined fraction of the cycle. As the charging stock constituents pass through the bed, the aromatic desorbent in the adsorbed phase will be largely displaced and the aromatic components of the charging stock will be adsorbed. The saturate constituents of the stock will initially be adsorbed to an extent but, due to the selective action of the adsorbent, the proportion of aromatics to saturates in the adsorbed phase will be much higher than in the liquid phase. After a suitable amount of charging stock has been introduced, determined by a constant rate of introduction for a definite period of time, the next phase is begun involving the introduction of the saturate desorbent (butane). Because of the greater affinity of the adsorbent for aromatic hydrocarbons, the butane will displace relatively little of the aromatic constituents from the adsorbed phase but will desorb the saturate constituents therefrom and drive before it out of the container saturate constituents in the liquid phase.

Following the introduction of a predetermined amount of the butane desorbent by maintaining constant flow for a predetermined phase time, the aromatic xylene desorbent is introduced at a constant rate for the remainder of the cycle. The xylene not only drives out of the adsorbent chamber the butane but also displaces from the adsorbed phase the aromatic constituents of the charging stock.

The foregoing outlines briefly the input phases of the cycle which are carried out through predetermined portions of the cycle.

Figure 2:
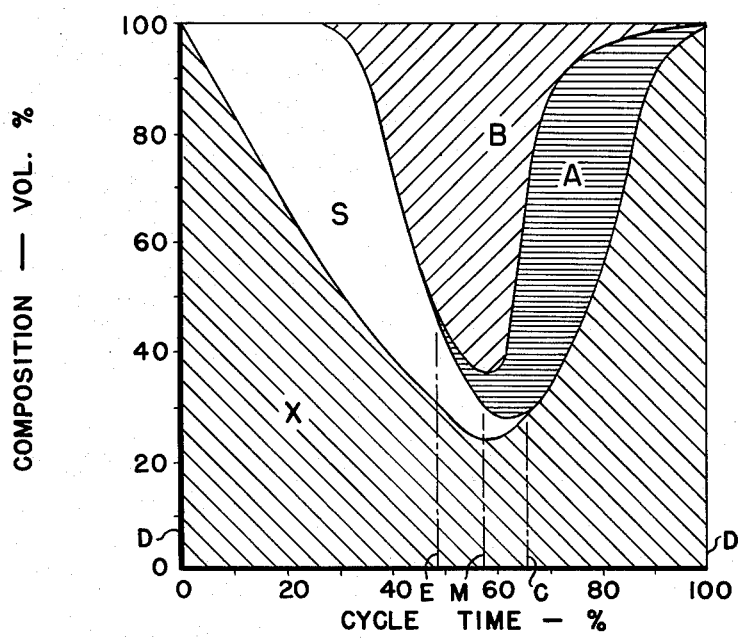
FIGURE 2 is a diagram indicating the type of process to which the control apparatus may be applied, the diagram showing the volumetric composition of an effluent plotted against the percentage of a cycle.

Reference may now be made to FIGURE 2 which indicates the volumetric percentages of the various input materials appearing in the effluent at various portions of the cycle. The zero of time of this figure does not correspond to the beginning of the input cycle previously described since it will be evident that the output cycle will bear a relation to the input cycle which will depend very substantially on the volume of the adsorbent used, the liquid throughput rate, the porosity and interstitial volume of the adsorbent and other factors. From the standpoint of matters of interest in the present application it need only be considered that there will exist for a particular apparatus, and for particular constituents, and for particular lengths of the input phases, a reasonably definite relationship between the input and output cycles, the relationship varying somewhat with changes of composition of the charging stock and with other variables such as decreased adsorptive capacity of the adsorbent, etc.

FIGURE 2 shows a typical cycle of the effluent composition but it will be understood that this will vary substantially depending upon conditions such as those just mentioned. Referring, however, specifically to the example shown in FIGURE 2 the zero of time of the effluent cycle is taken as the time at which substantially pure aromatic desorbent is flowing from the adsorbent chamber. For efficient operation the input cycle will have been adjusted so that this substantially pure aromatic desorbent will flow out of the chamber for only a short period of time whereupon the effluent will comprise increasing percentages of the saturate fraction from the charging stock as it is displaced from the adsorbent. In the figure the region X represents the aromatic xylene desorbent while the region S represents the saturates. A time is thereafter reached when the saturate desorbent, i.e. butane, begins to constitute a substantial percentage of the effluent as indicated by the increasing area at B representing the saturate desorbent content. Then there occurs an increasing percentage of the aromatic fractions of the charging stock indicated by the area A. There is a fading out of the saturate fractions of the charging stock, then a substantial decrease of the saturate desorbent and finally of the aromatic fraction of the charging stock so that at the end of the cycle the effluent is again substantially pure aromatic desorbent and the cycle begins again.

The letter D is used to indicate the beginning of a cycle which is the end of the preceding cycle. It will be noted that between time D and the time represented at E that the effluent will be substantially free of the aromatic fractions of the charging stock. Between the time C and the end of the effluent cycle it will be noted that the saturate fractions of the charging stock are absent from the effluent. Between E and C both saturate and aromatic fractions from the charging stock are in the effluent.

If, as is usually desirable, the aromatic fractions are to be obtained substantially free of the saturate fractions, it will be evident that the effluent following the time C and up to the end of the cycle at D may be processed to remove the desorbent contents and this processing will not be accompanied by any of the constituents of the saturate fraction of the charging stock. It may be here noted that involved in this process is the use of a highly volatile saturate desorbent, butane, and a relatively high-boiling aromatic desorbent, xylene, which of course will normally be a mixture of xylenes. The charging stock will in general have a boiling point intermediate the boiling points of butane and xylene but the saturate and aromatic fractions of the charging stock will have substantially the same boiling point so as to be inseparable by distillation.

Accordingly the effluent following time C and up to time D may be subjected to distillation with quite complete and readily obtained separation of the low-boiling butane from the recovered aromatic products which in turn will be separated from the high-boiling desorbent xylene. The aromatic constituents such as benzene and toluene may be fractionally separated in the same distillation procedure.

Similarly the effluent obtained from the beginning of the cycle up to the time E may be fractionated to separate the volatile butane from the less volatile saturate constituents which in turn will be separated from the relatively high boiling xylene desorbent. The aromatic fractions of the charging stock being absent, the saturate fractions thereof may be obtained in substantially pure condition. As between the effluents obtained in the cycle prior to time E and subsequent to time C these effluents may be routed to the respective distillation units from which there will be recovered the saturate constituents and the aromatic constituents of the charging stock, the desorbents being recovered and sent back to the adsorbent chamber for desorbing use.

Between the times E and C, however, the effluent will contain beside the desorbents varying mixtures of the saturate and aromatic fractions from the charging stock. Desirably the effluent of this period will be returned to the charging stock for recycling. Preliminarily to this return, the xylene and butane may be removed by fractionation.

To summarize the above it will be evident that the effluent cycle contains, from the standpoint of its proper routing, three phases which may be respectively designated, in the order appearing in FIGURE 2, the saturate phase, the recirculation phase and the aromatic phase. If these phases bore a definite relationship to the charging phases at all times the entire cycle of charging and effluent could be controlled by simple timing. However, depending upon variable factors such as variations in composition of the charging stock, gradual deterioration of the adsorbing agent, changes of temperature and the like, the compositions represented in FIGURE 2 will vary, which variation will generally appear primarily as a shift toward the right or toward the left of the inverted peaks of the boundaries between the various effluent constituents with possibly also some vertical variations in these peaks amounting to changes of relative percentages of the constituents. In other words, the primary effect will be that of shifting of the times represented at E and C. The efficiency of the process depends largely upon controls of the effluent to secure proper routings thereof changed at the times represented at D, E and C of FIGURE 2.

From what has been said it will be evident that proper control of the process would probably involve the utilization of the time of occurrence of the inverted peaks of the boundary curves in FIGURE 2 to establish datum points in the cycles. It has been found in practice that this is the case.

Figure 3:
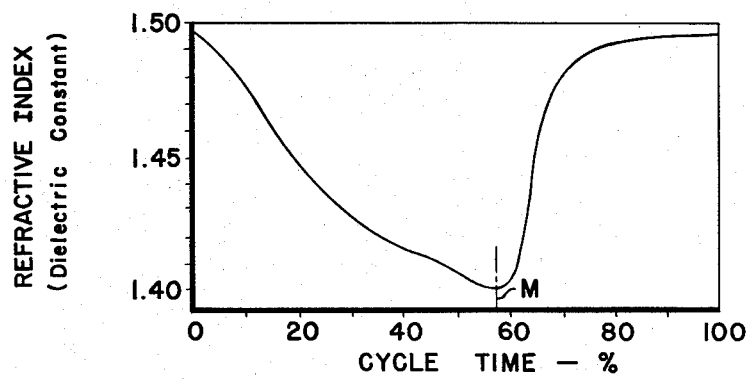
FIGURE 3 is a diagram having the same abscissae as FIGURE 2 but showing the corresponding plot of refractive index of the effluent or, as will appear hereafter from a general and distorted scale standpoint, the dielectric constant of the effluent.

It has been found, furthermore, that the refractive index of the effluent may be used to determine a datum point for reference for the phases of the cycle. FIGURE 3 shows a typical curve of refractive index plotted against percentages of cycle time, this curve of refractive index corresponding to the compositions indicated in FIGURE 2. This curve has a minimum value at time M and it will be evident by referring to FIGURE 2 that this time M falls in the phase between E and C. Experience has, furthermore, shown that although variations take place as described above in the effluent compositions, so long as the conditions of the process are maintained reasonably the same the time between M and C and the time between E and M remain substantially constant. Accordingly the time M has been utilized as a datum in manual control of the process, monitored by observation of the refractive index, the aromatic phase of the effluent being started in a definite relationship to the time of occurrence of the minimum refractive index.

While, as pointed out hereafter, the minimum value of refractive index may be utilized for automatic control, it has been found simpler to utilize the dielectric constant of the effluent as the variable for determination of the control datum. On the basis of simplified theory it is usually stated that the refractive index is equal to the square root of the dielectric constant. Careful measurements reveal that this is only approximately true but in any event it is true that the dielectric constant of the effluent in the process under consideration does have a minimum sufficiently close to the minimum of the index of refraction to make usable this minimum of the dielectric constant for establishing the datum point. Accordingly for purposes of present consideration the curve in FIGURE 3 may be considered as also representative of the variation of dielectric constant with percentage of cycle time with the understanding that the ordinates are, of course, no longer linear.

The control apparatus may now be described with particular reference to FIGURE 1.

A high frequency oscillator of conventional type is indicated at 2, this including the triode 4, frequency-controlling crystal 6, and the tuned tank 8 together with other conventional elements providing an output at a convenient frequency such as, for example, 175 kilocycles. The frequency used may vary between wide limits. In order to provide a low frequency alternating signal, the oscillator is operated in so-called self-rectifying fashion, the anode-cathode circuit being provided with alternating current, for example at the conventional 60 cycles, through the transformer indicated at 10. The output of the oscillator is accordingly at the crystal controlled frequency but modulated at the low frequency of the supply.

Inductively coupled through coil 14 to the coil of the tank 8 there is a tuned detecting circuit generally indicated at 12 which comprises an adjustable condenser 16 and a fixed condenser 18 arranged in parallel with coil 14 to provide a circuit tuned to a frequency which may be slightly less than that of the oscillator. This tuned circuit feeds its output to the illustrated arrangement if diode 20, condenser 24 and resistance 22 to provide across the resistance 22 an output which consists of a direct component and also of a low frequency alternating component corresponding to the modulating frequency of the oscillator. It may be pointed out that this output provides, in effect, only a reference voltage (both A.C. and D.C.) which would be constant if the amplitude of the oscillator was constant, and is made dependent upon the oscillator operation only to provide compensation for drifts of oscillator output amplitude.

A second similar detecting circuit is provided at 26 which comprises the coil 28, inductively coupled to the coil of the tank 8, which is shunted to provide a resonant circuit by the variable condenser 30 and a condenser indicated at 32 which in a general way corresponds to the fixed condenser 18 of the circuit 12. The condenser 32 is of a type which utilizes the effluent from the adsorbent chamber as the dielectric, and for this purpose may comprise a cylindrical chamber 34 of metal having an inlet passage 36 and an exit passage 38 for the effluent, the chamber being arranged in a bypass to the effluent line. Extending axially and centrally into the chamber 34 is a suitable electrode 40 in the form of a metallic rod mounted in an insulating cover 42. This electrode 40 is connected to the upper terminal of condenser 30 while the chamber 34 is grounded as is also the lower terminal of condenser 30. There is thus provided in parallel with condenser 30 a condenser of variable capacity depending upon the value of the dielectric constant of the effluent which effluent provides the dielectric for this condenser. Associated with the tuned circuit thus provided, is the diode 44 in association with a condenser 48 and resistance 46. Consistently with the attainment of minimum values of dielectric constant as herein specifically described, the circuit 26 would be tuned to a frequency somewhat less than that of the oscillator; but it will be evident that the tunings of the circuits 12 and 26 with respect to each other and to the oscillator frequency, and the polarity arrangements of the diodes 20 and 44 may be rearranged to give the same results or to give opposite results, the latter for determination of maximum value of dielectric constant rather than minimum value.

It will be noted that while the resistances 22 and 46 are in series, the combined direct and alternating outputs appearing across their outer terminals will be due to the difference of the potentials appearing across the individual resistances in view of the opposed arrangements of the diodes 20 and 44. A condenser 50 is connected across the outer terminals of the resistances 22 and 46 and there will appear between a terminal 52 and a ground a direct potential which will constitute a measure of the dielectric constant of the effluent, the arrangement being such as to provide a fairly linear relationship between this output potential and the dielectric constant through the region of variation which is of interest. There may be connected to the terminal 52 a conventional direct current recorder to serve as a continuous monitor of the process.

Across the condenser 50 there will also appear an alternating component of the output at the frequency of modulation of the oscillator having an amplitude corresponding to that of the direct component. This alternating component is fed through condenser 54 to a conventional amplifier comprising the triode 56 and pentode 58 and their usual connections, with negative feedback provided through condenser 59.

The output of this amplifier is delivered through condenser 60 from the anode of pentode 58 to the cathode of a diode 62. The anode of this diode 62 is connected through resistance 64 to the anode of a second diode 68 the cathode of which is connected to ground through condenser 70 paralleled by resistance 72. A condenser 66 connects the anode of diode 68 to ground. The cathode and anode of diode 62 are respectively connected through resistances 65 and 63 to the point 67 of a voltage divider connected between a positive potential source and ground. As will more fully appear hereafter the resistance 64 and condenser 66 provide an RC combination of relatively small time constant while the resistance 72 and condenser 70 provide an RC combination of large time constant.

The cathode of diode 68 is connected to the control grid of a thyratron 74 the cathode of which is connected through the parallel arrangement of condenser 76 and resistance 78 to the anode of diode 68. The cathode of the thyratron 74 is connected through a large condenser 80 and a relay coil 82 to the anode of the thyratron. As will appear hereafter firing of the thyratron results in discharge of condenser 80 through the relay coil 82. The condenser 80 is charged and multiple firings of the thyratron are prevented by means of a circuit which will now be described.

Input of power is provided by a transformer 84 connected to an alternating current source. One end of the secondary of this transformer is connected to the anode of a diode 86 the cathode of which diode is connected to the anode of a triode 88 having its cathode connected through resistance 90 to the junction of the condenser 80 and relay coil 82. The grid of triode 88 is connected to its cathode through condenser 94 and resistance 92. The cathode of diode 86 is connected through resistance 96 to the cathode of the thyratron 74. A condenser 98 is provided between the cathode of diode 86 and the cathode of triode 88. Another condenser 100 of large capacity value is connected between the cathode of diode 86 and the terminal of the secondary of transformer 84 which is remote from diode 86. This same terminal of the transformer secondary is connected at 101 to the junction of resistance 78 and condenser 76 which is remote from the cathode of the thyratron. The same terminal of the transformer secondary is connected at 102 to the contact 103 of the relay having the coil 82, the armature 104, which as arranged to engage this contact when the coil is energized, being connected at 106 to the grid of triode 88. A second armature 108 of the relay is connected to a positive potential supply terminal 110 and is adapted, when the relay is energized, to engage a contact 109 which through the resistance-capacitance arrangement indicated at 112 provides an output to an electronic timing circuit.

The electronic timing circuit just mentioned takes the form of a monostable multivibrator of conventional type comprising the triodes 114 and 116, the control grid of triode 114 being connected to the resistance-capacitance arrangement 112 through line 113. The cathodes of the two triodes of the multivibrator are connected to each other and to ground. Resistances 118 and 120 are respectively connected to the anodes of the triodes and the former is connected to a positive potential supply terminal through a relay coil 136, while the latter is connected directly to a positive potential supply terminal. The anode of triode 116 is connected to the grid of triode 114 through resistance 122. A resistance 124 connects the grid of triode 114 to a negative potential supply terminal 126. The anode of triode 114 is connected to the grid of triode 116 through a large condenser 128. The grid of triode 116 is connected to ground through a variable resistance 130. As is usual the duration of the astable state of the monostable multivibrator is largely determined by the time constant of the combination of the capacity of condenser 128 and the resistance value of resistance 130. The grid of triode 116 is connected to the cathode of a diode 132 the anode of which is connected to a negative potential supply terminal 134. This arrangement limits the negative value of potential which may be imposed on the grid of triode 116.

The armature 138 of the relay which includes the coil 136 is connected to ground and normally engages, when the relay coil is deenergized, the contact point 139 which is connected through the parallel arrangement of condenser 140 and resistance 142 to the grid of a triode 144 the cathode of which is grounded. The grid of triode 144 is connected through resistance 146 to a negative potential terminal 148. The anode of triode 144 is connected through relay coil 150 to a positive potential supply terminal.

The armature 152 of the last mentioned relay normally engages its contact point 153 and is connected through relay coil 154 to a supply terminal 156, the contact 153 being connected to the other supply terminal 157, these terminals being provided with alternating current from the commercial supply. An armature 158 arranged to be acted upon by energization of relay coil 154 forms part of a conventional timer which is here only briefly diagrammed. This timer comprises a motor arrangement 178 which is adapted in conventional fashion to move the armature 158 into engagement with a contact point 160. The arrangement is such that the armature 158 is alternately engaged either with contact point 160 or a contact point 172. When the armature 158 is in engagement with contact point 172 the pull on the armature due to energization of coil 154 will be insufficient to shift it to engagement with point 160. However, when the armature is in contact with point 160 the relay coil 154 will exert sufficient pull to maintain this contact. The timing cycle as will be more apparent hereafter involves first the release of armature 158 upon deenergization of coil 154. This release causes the armature to engage contact point 172 which, as will be apparent from the diagram will result in connection of the timer motor 178 across the supply line from terminals 156 and 157. After a predetermined set interval of operation the motor 178 will mechanically move the armature 158 into engagement with contact point 160 and will then release the armature. This will result in stopping of the motor 178. At this time the coil 154 will be energized and consequently the armature 158 will be held in engagement with contact point 160 until the timing cycle is repeated.

It will be noted that contact point 172 is connected to a terminal 174 which is paired with a terminal 176 connected to the supply terminal 156. Terminals 174 and 176 when energized effect operation of a solenoid valve as will be pointed out later.

The contact point 160 is connected to a coil 162 with which is associated the armature 164 arranged to make contact alternatively with the lower contact point 166 or the upper contact point 180. Contact point 180 is connected to one terminal of a second timer motor 186 the other terminal of which is connected to the supply terminal 156. The armature 164 is in this case connected to the contact 160. The arrangement of the timer and the operation thereof is similar to the timer arrangement previously described, the coil 162 being able to hold the armature 164 in engagement with lower contact 166 but being unable to pull it from engagement with contact point 180, which engagement is interrupted, with the establishment of engagement at contact 166 by the timing action of the motor 186.

Contact point 180 is also connected to a terminal 182 paired with a terminal 184 connected to supply terminal 156, the terminals 182 and 184 providing supply of current to a second solenoid valve.

Contact point 166 is connected to a terminal 168 which is paired with a terminal 170 connected directly to supply terminal 156. These terminals 168 and 170 serve to supply current to a third solenoid valve.

Besides the electrical connections already described, FIGURE 1 shows diagrammatically certain parts of the processing apparatus. At 188 there is indicated the adsorbent tank containing silica gel as referred to above. Valved supply lines 190, 192 and 194 are arranged to supply sequentially in the cycle of operation to the tank 188 the charging stock, and the two desorbents as discussed above, the valves being timed in fixed sequence.

The effluent line 196 from the tank 188 is indicated and there is repeated in connection with the line 196a showing of the condenser arrangement 32 which receives a bypass flow from the main effluent line. Branch lines 198, 202 and 206 connect to the effluent line 196 and are respectively controlled by the solenoid valves 200, 204 and 208 which are respectively opened by energization through the pairs of terminals 174 and 176, 182 and 184, and 168 and 170. The line 198 receives the effluent during the aromatic phase of the cycle, i.e. when the aromatic contents of the charging stock appear in the effluent. Line 202 receives the saturates of the charging stock during the saturate phase of the cycle. Line 206 receives the mixture of aromatic and saturates from the charging stock during the recirculation phase of the cycle. These lines route the effluent to the distillation units which effect the separations as previously described.

The operation of the control apparatus for the detection of minimum dielectric constant of the effluent may be described as follows:

As has been pointed out, the alternating potential delivered to the grid of triode 56 will correspond in amplitude approximately linearly to the value of the dielectric constant and in the apparatus as shown the amplitude of this alternating signal will increase with the value of dielectric constant and conversely. This end is, of course, achieved by the proper relative tuning of the circuits 12 and 26. The signals appearing at the grid of triode 56 will be delivered at considerable amplification to the cathode of diode 62. The anode and cathode of diode 62 are biased to the same direct potential by the connections through resistances 63 and 65 to the point 67 of the voltage divider and it will be evident that the effect of diode 62 is to impose varying negative signals at the left-hand end of resistance 64 algebraically added to the positive bias potential.

Assume, to begin with, that the thyratron 74 is in non-firing condition, the grid being negative to a sufficient extent with respect to its cathode. In fact, for simplicity, it may be assumed that signals of constant amplitude have been for a long period imposed at the left-hand end of resistance 64. If the ungrounded end of condenser 66 was at any time positive with respect to the ungrounded end of condenser 70 the diode 68 would have provided a direct connection between the two condensers to equalize their potentials. As a matter of fact, steady conditions of input would necessarily lead to this result since condenser 70 would normally drop to ground potential because of the leakage resistance 72, whereas the anode of diode 68, i.e. the ungrounded end of condenser 66 will always be positive above ground, in view of the connection at one side to the point 67 and at the other side to the cathode of the diode 86, the connections to the former being through resistances 64 and 63 and to the latter through resistance 78 and resistance 96. The result is that the normal condition which must exist is that of the control grid of thyratron 74 at a negative value, with respect to the thyratron cathode determined by the flow of direct current through resistance 78.

Assume now that the condition changes in the direction of less alternating signal to the cathode of diode 62 corresponding to decrease of dielectric constant in the cell 32. Less negative signal will now be delivered to the left-hand end of resistance 64, with the result that the direct current connections involving the resistances above referred to will produce a rise of potential on the condenser 66, causing the anode of diode 68 to be positive with respect to its cathode, with a consequent current flow which will cause condenser 70 to maintain a potential essentially equal to that of condenser 66. Though the potentials of both condensers rise together, the difference in potential between the grid and cathode of the thyratron will remain substantially constant, corresponding to the potential drop through resistance 78, due to direct flow of current.

In contrast, assume that the signals applied to the cathode of diode 62 increase in amplitude, corresponding to an increase in dielectric constant of the effluent. Under these conditions, increased negatives signals are applied to the left-hand end of resistance 64, and the potential of the condenser 66 will drop at a rate depending upon the time constant provided by resistance 64 and condenser 66. As pointed out above, this time constant is relatively low.

Since condensers 66 and 70 were charged to substantially the same potential, the drop of potential of condenser 66 will result in making the anode of diode 68 more negative than its cathode. The diode will thus be cut off. Condenser 70 will discharge through resistance 72. But as pointed out above, the time constant of the combination of condenser 70 and resistance 72 is relatively high, and the result will be that the drop of potential at the grid of the thyratron will be at a substantially less rate than the drop of potential at the cathode of the thyratron, which will eventually drop to such a value despite the direct current flow through resistance 78, that a firing condition will result. It may be noted that the amplification of the alternating signals may be quite high, with the result that only a very slight rise of the alternating input signals will result in a large change of potential between the grid and cathode of the thyratron.

In summary of the foregoing it may be stated that the circuit is very insensitive to changes of the signals (or equivalently of the dielectric constant) in a decreasing direction, but extremely sensitive to an increase of the signals (or of the dielectric constant). Thus the minimum of a variation such as that illustrated in FIGURE 3 may be very accurately determined and made effective to fire a thyratron.

It will be evident that instead of a thyratron there may be used, if desired, a thermionic vacuum tube at the position of the thyratron with a resulting increase of anode-cathode current as the minimum of an input signal is passed. Furthermore the circuit is of quite general utility since it will be evident that the signals introduced, for example at the cathode of diode 62, may be derived from various sources giving rise to signals of increasing and decreasing amplitude with changes of some variable condition which is to be determinative of a control operation.

When a thyratron is involved, it is, of course, generally necessary to stabilize the operation to provide a single firing or at least to delay multiple firings until after some critical control condition has been initiated. This is the case in the present instance, in which it will be evident that the grid-cathode potential of the thyratron would remain in a firing condition throughout the subsequent rise, after the minimum of a condition such as illustrated in FIGURE 3. To secure proper action, there is provided the circuit arrangement which, in FIGURE 1, is shown to the right of the thyratron. During the inactive period of the thyratron, the large condenser 80 is charged through the rectifying diode 86, triode 88 and resistance 90. During the charging period, the grid of triode 88 will be essentially at cathode potential so that this triode will be highly conductive. Firing of the thyratron involves discharge of the condenser 80 through the relay coil 82. Energization of relay coil 82 will cause armature 104 to engage contact point 103, which will connect the right-hand end of the secondary of transformer 84 directly to the grid of triode 88. Condenser 100 is of high capacity value, and the result of this action is to render the grid of triode 88 highly negative with respect to its cathode. Furthermore, condenser 94, which is of relatively large value, is charged correspondingly. It is shunted by a relatively high resistance 92, and the result is that triode 88 is cut off for a prolonged period, even after armature 104 is released after the surge of current through coil 82. Charging of condenser 80 cannot reoccur until triode 88 is restored to a conducting condition. The thyratron is thus prevented from again firing until a time at which firing will have no harmful effect. Such time as will be presently apparent, is a time following the delay action of an electronic timer, the operation of which will now be described.

Firing of thyratron 74 produces contact between armature 108 and contact point 109 producing a positive pulse at the grid of triode 114. Triode 114 is normally cut off by reason of the connection of its grid through resistance 124 to negative terminal 126, while triode 116 is normally conducting by reason of the fact that its grid is at ground potential by connection through resistance 130. The positive pulse at the grid of triode 113 trips the multivibrator to its astable state, the triode 114 becoming conductive while the triode 116 is cut off due to a negative pulse through condenser 128 applied from the anode of triode 114 as it becomes conductive. The multivibrator then returns to its stable state after an interval determined by the time constant of the circuit provided by condenser 128 and resistance 130. This time constant is adjustable and sufficiently great to provide the time delay between M and C of FIGURE 2. Definiteness of value of the delay interval is provided by the presence of diode 132 which limits the negative excursion of the potential of the grid of triode 116 at the initiation of the astable state.

When triode 114 is rendered conductive the contact at 138, 139 is open. Prior to this time the triode 144 has been held non-conductive by reason of the connection of its grid to the negative terminal 148 through resistance 146 and its connection through resistance 142 to ground. When the armature 138 disengages contact 139 the triode 144 remains non-conductive and, in fact, its grid becomes even more negative since the connection between resistance 142 and ground is opened. When, however, the multivibrator returns to its stable state and contact is again reestablished at 138, 139 the potential at the grid of triode 144 rises to ground potential and then again becomes negative as condenser 140 recharges. When the grid rises to ground potential the triode 144 becomes conductive so that coil 150 is energized and armature 152 is disengaged from contact 153. This last disengagement deenergizes coil 154 releasing armature 158 to engage contact 172 and when the connection with contact point 160 is broken coil 162 is also deenergized releasing armature 164 to engage contact 180. It will be noted that prior to this the conditions are as illustrated in FIGURE 1 and terminal 168 is connected to line 157 through armature 158, contact 160, armature 164 and contact 166. Accordingly the solenoid valve 208 is open and effluent flows through connection 206 for the recirculation phase of the cycle.

When armature 158 is released as above mentioned and engages contact 172 the terminal 174 is energized and solenoid valve 200 is opened to route the effluent through line 198 for the aromatic phase of the cycle, the terminal 168 being deenergized to result in closure of the valve 208. At the same time, the timer motor 178 is energized to provide the interval CD of FIGURE 2. At this time, while armature 164 engages contact 180, it will be noted that no current flows to contact 180 because of the break of the circuit at contact 160.

At time D the motor 178 will restore engagement between armature 158 and contact 160, and this engagement will be held because coil 154 will be again energized due to the restoration of non-conductive condition of triode 144. It may be noted that in the meanwhile the inputs to the thyratron will have become such that the thyratron will not fire and consequently the multivibrator will be continuously in its stable state.

When contact between armature 158 and point 160 is reestablished, breaking contact at 172, the valve 200 will close. At the same time the valve 204 will be opened since armature 164 engages contact 180 and is connected to line 157 through armature 158 and contact 160. The saturate phase of the cycle is thus established. Timer motor 186 is energized and produces the interval between D and E of FIGURE 2. At the end of this interval the armature 164 is again restored to contact with point 166 and the recirculation phase is reestablished as previously indicated. In summary of the foregoing it will be noted that the electronic timer constituted by the multivibrator determines the interval between M and C, this interval being adjustable by adjustment of resistance 130, the interval between C and D is established by the timer 178 and the interval between D and E is established by the timer 186. At E the system reverts to the recirculation phase which includes the time M at which the thyratron fires to start again the timing by the multivibrator. It will thus be seen that the effluent cycle is timed with reference to the attainment of the minimum value of dielectric constant, the circuit being sufficiently sensitive to start the timing practically simultaneously with the occurrence of the minimum, actually the firing of the thyratron taking place slightly after the occurrence of the minimum as soon as the value of the dielectric constant rises sufficiently to produce the necessary thyratron-firing action.

Figure 4:
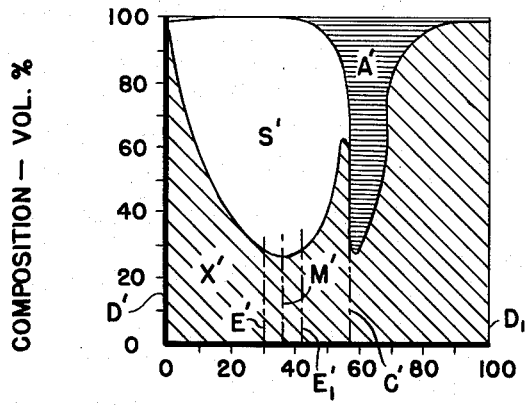
FIGURES 4 and 5 are diagrams respectively similar to FIGURES 2 and 3 but illustrating conditions of a different process.
Figure 5:
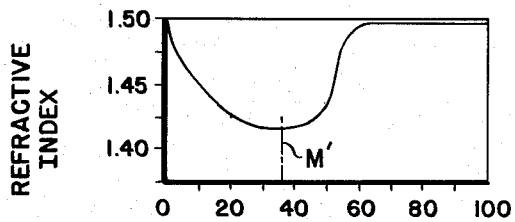

FIGURES 4 and 5 are illustrative of a somewhat different process to the control of which the apparatus of the present invention is applicable. The adsorption process previously descrbed may be modfied to use as desorbent only the aromatic desorbent such as xylene without using the saturate desorbent, butane. It will suffice for present purposes to point out that the timed input phases involve successively the introduction of the charging stock and xylene desorbent and that the effluent, shown in the diagram constituting FIGURE 4 which corresponds to FIGURE 2, has characteristics through the cycle as there illustrated. The aromatic, saturate, and aromatic desorbent constituents of the effluent are indicated respectively at A', S' and X'. The corresponding variation of refractive index (or dielectric constant) is indicated in FIGURE 5, the curve showing a minimum at M'. The cycle may be controlled in the same fashion as previously described and it will be recognized that in such case the times C', D' and E' will correspond to the times C, D and E of FIGURE 2. It will, however, be evident that the recirculation phase of the cycle may be more limited if it is not required that the aromatic constituents should be substantially completely absent from the saturate constituents after separation. The recirculation phase of the cycle may, for example, be initiated at $E_1'$ rather than at E'. It will now be evident that $E_1'$ is subsequent to the time M' of minimum refractive index or dielectric constant. Proper routing of the effluent will then involve merely interchanges of connections of the solenoid valves 200, 204 and 208, the valve involving recirculation being the one which will be opened at the end of the delay time set by the electronic timer.

Figure 6:
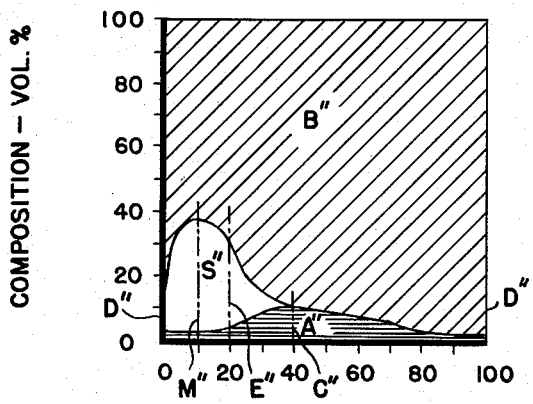
FIGURES 6 and 7 are diagrams respectively similar to FIGURES 2 and 3 but illustrating conditions of still another process.
Figure 7:
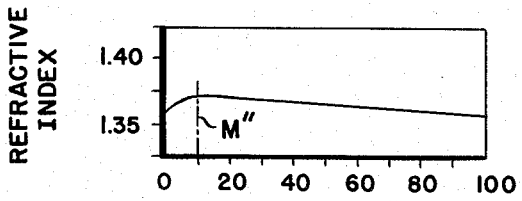

Still another and more considerably different type of cycle is illustrated in FIGURES 6 and 7. These figures relate to an adsorption system in which, as contrasted with that first described, the aromatic desorbent is omitted and there is used only a saturate desorbent which typically may be isopentane. In this case the input cycle involves successive phases of introduction of charging stock and of the saturate desorbent. The effluent will then vary during the cycle as illustrated in FIGURE 6, the aromatic, saturate and desorbent constituents being respectively indicated at A", S" and B". The corresponding variation of refractive index or dielectric constant is then as illustrated in FIGURE 7. In this case it will be noted that there occurs most closely related to the desired recirculation phase of the cycle a maximum of the refractive index at M" rather than a minimum as previously was the case.

In this process the recirculation phase of the cycle extending from E" to C" is subsequent to the maximum M″. The aromatic effluent phase extends from C″ to D″ and the saturate effluent phase extends from D″ to E″. (It will be noted that the curve of refractive index does have a minimum at substantially D″; but this minimum is substantially separated from the recirculation phase which it is more important to control and consequently better accuracy of control may be secured if the maximum point M″ is utilized to provide the timing signal.)

The maximum of the dielectric constant may be utilized to provide the signal rather than the minimum in various fashions of which the simplest variation from what has been described in connection with FIGURE 1 would involve merely tuning the circuits 12 and 26 to frequencies differing from the oscillator frequency in an opposite sense from that used for determining a minimum, or involving interchange of diode polarities. However, many other expedients are well known in the electrical arts for converting increasing signals to decreasing signals or vice versa by phase inversion, proper biasing or the like and any of these may be used. The point primarily to be made is that the terms "maximum" and "minimum" are essentially interchangeable.

It will now be evident that while particular processes have been described to which the control is applicable, the invention may be used for the determination of maximum or minimum values of signals derived from a great variety of sources provided only that some transducer is used for converting an original variable into electrical signals such as those which are applied to the cathode of diode 62 in FIGURE 1. Such signals may not only originate in entirely electrical devices such as that discussed but in photoelectric devices, sound pickups, thermocouples, electromagnetic sources or the like.

Furthermore it will be evident that the application of the invention to detection of minima or maxima represents only a special case and that actually the invention is more broadly applicable. Mathematically, considering time as the independent variable, a maximum is defined as occurring at the point where the first time derivative of the dependent variable is zero and the second time derivative is negative. A minimum is correspondingly defined as a point where the first time derivative is zero and the second time derivative is positive. The zero value for a first time derivative is a special one and obvious generalization would involve the situation in which the first time derivative has a value which was definite but other than zero.

Figure 9:
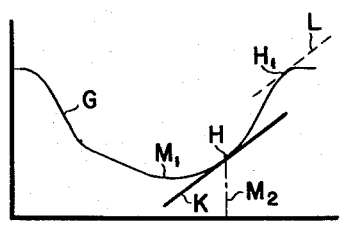
FIGURE 9 is a diagram showing a variation of a function with time and explanatory of the operation of the modification illustrated in FIGURE 8.

Consider for example Figure 9. G represents the variation of a dependent variable with time. This variable is shown as having a minimum value $M_1$. Suppose, however, that it is desired to secure control at a point H arrived at at time $M_2$ when the variable has a slope of definite amount corresponding to the tangent K. Assuming the variable to be cyclic and continuous there will, of course, be another point $H_1$ at which it will have the same slope indicated by the tangent L. The two points H and $H_1$ may be distinguished, however, by the fact that at H the second time derivative of the curve G is positive while at $H_1$ the second time derivative is negative. The present invention is applicable to detection of the point H in distinction from the point $H_1$, and will give rise to a signal at the time $M_2$ corresponding to point H.

Figure 8:
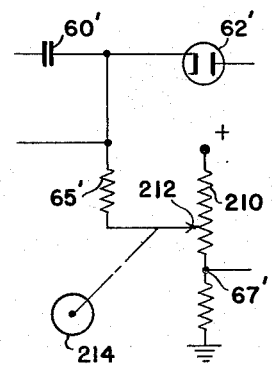
FIGURE 8 is a fragmentary wiring diagram illustrating a modification of FIGURE 1.

The result just outlined may be secured by a minor variation of the circuit of FIGURE 1 as indicated in FIGURE 8 in which the various elements 60′, 62′, 65′ and 67′ correspond to the elements of corresponding unprimed numbers in FIGURE 1 and will serve to identify the portion of the circuit which is changed. The change involves the provision of a potentiometer 210 between the terminal 67′ and the positive supply terminal which is connected to it in FIGURE 1. The contact of potentiometer 210 is indicated at 212 and is connected to the lower end of resistance 65′. The potentiometer contact 212 is arranged to be moved slowly upwardly or downwardly along the potentiometer resistance by a motor 214. As was pointed out in describing FIGURE 1, an increasing negative signal through diode 62 (originating as an alternating signal which is rectified by the diode) will produce firing of the thyratron 74. In the arrangement of FIGURE 1 in which the cathode of diode 62 is biased at a constant positive direct potential, the firing will occur at the minimum of the signal. If, however, a change is made as illustrated by FIGURE 8, and the potentiometer contact 212 is continuously moved at a suitable rate toward the positive supply terminal, the occurrence of the minimum negative signal through diode 62 will, in effect, be delayed to such time as the change in the input signal overcomes the change applied from the potentiometer contact so that from the standpoint of the left hand end of the resistance 64 the minimum is delayed to such time as is indicated at $M_2$ in FIGURE 9. The slope of the tangent K corresponds to the rate of change of the positive potential applied from the potentiometer contact 212.

It will be evident, however, that in line with the previous discussion of FIGURE 1, there will not be produced a firing of the thyratron at the point $H_1$ where the curvature of the curve G is negative.

By reversal of the direction of movement of the potentiometer contact 212, it will be clear that the control point at which the thyratron is fired may be shifted to a point of the curve G preceding the minimum $M_1$. It will also be evident that with phase reversal or reversal of input conditions, similar results may be attained securing controls either before or after a maximum of the curve.

The foregoing may be generalized by stating that in accordance with the invention there is produced a signal substantially at a point of predetermined rate of change of a variable with respect to time and of predetermined sense or sign of variation of said rate of change; and furthermore this occurs independently of the value of the variable. This last has not been particularly stressed heretofore but it will be evident that any of the curves of FIGURES 3, 5, 7, or 9, could be shifted vertically without affecting the operation of determining a minimum, maximum or predetermined slope.

It will be evident that the particular circuit illustrated in FIGURE 1 is subject to variations in the matter of association of the short and long time constant circuits with the grid and cathode of the thyratron or with a control grid and cathode of another type of electronic tube. Either the long or short time constant circuit may be associated with the control grid or the cathode, the sole requirement being that the arangement should produce a rise of grid potential with respect to the cathode at the desired time of occurrence of the signal, or alternatively, a fall if cessation of firing of a continuously pulsing thyratron, or a fall of current through a vacuum tube, is determinative of a control instant. Either the cathode or grid could be caused to lag the other by association with the circuit having the longer time constant, the inputs to the two circuits being, of course, of proper sign to secure operation at the desired time.

What is claimed is:

1. In combination, a circuit comprising an electron tube having anode, cathode, and control grid elements, said circuit being of a non-linear type providing an abrupt output in response to attainment of a predetermined value of a smooth variation of potential of said grid element relative to said cathode element; circuit means interconnecting said cathode and grid elements, and means providing a slowly variable input to said circuit means, said circuit means providing in response to said variable input a variation of potential, of said grid element relative to said cathode element, to said predetermined value of said potential only substantially at the time of occurrence of both a predetermined time rate of change of said variable input and a predetermined sense of variation of said time rate of change, thereby to provide such abrupt output from said circuit; said circuit means comprising a pair of circuits having, respectively, relatively short and relatively long time constants, both of the last-mentioned circuits being responsive to said variable input and one of the last-mentioned circuits providing variations of potential of said cathode element and the other providing variations of potential of said grid element.

2. The combination of claim 1, in which said predetermined time rate of change is zero.

3. The combination of claim 1, in which the circuits of said pair are interconnected by a diode.

4. The combination of claim 1, in which said predetermined time rate of change is zero, and in which the circuits of said pair are interconnected by a diode.

5. In combination, a circuit comprising an electron tube having anode, cathode, and control grid elements, said circuit being of a non-linear type providing an abrupt output in response to attainment of a predetermined value of a smooth variation of potential of said grid element relative to said cathode element; circuit means interconnecting said cathode and grid elements, and means providing a slowly variable input to said circuit means, said last-mentioned means comprising devices sensitive to changes in the dielectric constant of a fluid and providing said input variable with such changes; said circuit means providing in response to said variable input a variation of potential, of said grid element relative to said cathode element, to said predetermined value of said potential only substantially at the time of occurrence of both a predetermined time rate of change of said variable input and a predetermined sense of variation of said time rate of change, thereby to provide such abrupt output from said circuit.

6. In combination, a circuit comprising an electron tube having anode, cathode, and control grid elements, said circuit being of a non-linear type providing an abrupt output in response to attainment of a predetermined value of a smooth variation of potential of said grid element relative to said cathode element; circuit means interconnecting said cathode and said grid elements, and means providing a slowly variable input to said circuit means, said last-mentioned means comprising a capacitance whose dielectric is a flowing fluid, and a circuit including said capacitance, means providing high frequency alternating current in said circuit, and means varying said input in accordance with changes in the last-mentioned circuit caused by variations of the dielectric constant of the fluid; said circuit means providing in response to said variable input a variation of potential, of said grid element relative to said cathode element, to said predetermined value of said potential only substantially at the time of occurrence of both a predetermined time rate of change of said variable input and a predetermined sense of variation of said time rate of change, thereby to provide such abrupt output from said circuit.

References Cited in the file of this patent

UNITED STATES PATENTS

| | | |
|---|---|---|
| 2,161,721 | Negus | June 6, 1939 |
| 2,270,773 | Sonnentag | Jan. 20, 1942 |
| 2,275,954 | Gibson | Mar. 10, 1942 |
| 2,284,850 | Smith | June 2, 1942 |
| 2,291,045 | Lancor | July 28, 1942 |
| 2,355,363 | Christaldi | Aug. 8, 1944 |
| 2,373,145 | Sensiper | Apr. 10, 1945 |
| 2,390,608 | Miller | Dec. 11, 1945 |
| 2,400,908 | Birss | May 28, 1946 |
| 2,408,078 | Labin | Sept. 24, 1946 |
| 2,413,020 | Wolfner | Dec. 24, 1946 |
| 2,433,599 | Cohen | Dec. 20, 1947 |
| 2,485,005 | Lindesmith | Oct. 18, 1949 |
| 2,529,290 | Glass | Nov. 7, 1950 |
| 2,531,265 | Franzel | Nov. 21, 1950 |
| 2,548,790 | Higinbotham | Apr. 10, 1951 |
| 2,549,764 | Bartels | Apr. 24, 1951 |
| 2,588,882 | Rolfson | Mar. 11, 1952 |
| 2,607,830 | Razek | Aug. 19, 1952 |
| 2,610,246 | Goldsmith | Sept. 9, 1952 |
| 2,644,124 | Broadbent | June 30, 1953 |